(12) United States Patent
Lee et al.

(10) Patent No.: US 12,211,172 B2
(45) Date of Patent: Jan. 28, 2025

(54) DISPLAY DEVICE AND OPERATING METHOD OF THE SAME

(71) Applicant: SAMSUNG ELECTRONICS CO., LTD., Suwon-si (KR)

(72) Inventors: Hyunseung Lee, Suwon-si (KR); Donghyun Kim, Suwon-si (KR); Younghoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 262 days.

(21) Appl. No.: 17/887,236

(22) Filed: Aug. 12, 2022

(65) Prior Publication Data

US 2023/0114954 A1 Apr. 13, 2023

Related U.S. Application Data

(63) Continuation of application No. PCT/KR2022/010800, filed on Jul. 22, 2022.

(30) Foreign Application Priority Data

Oct. 7, 2021 (KR) .................. 10-2021-0133450

(51) Int. Cl.
*G06T 3/4046* (2024.01)
*G06T 3/4007* (2024.01)
*G06V 10/25* (2022.01)

(52) U.S. Cl.
CPC .......... *G06T 3/4046* (2013.01); *G06T 3/4007* (2013.01); *G06V 10/25* (2022.01)

(58) Field of Classification Search
None
See application file for complete search history.

(56) References Cited

U.S. PATENT DOCUMENTS 10,504,027 B1 12/2019 Kim et al.
11,176,402 B2 * 11/2021 Kim .................. G06V 10/82
(Continued)

FOREIGN PATENT DOCUMENTS

JP 5352332 B2 11/2013
JP 2020-127081 A 8/2020
(Continued)

OTHER PUBLICATIONS

Wang, Xintao et al., "Recovering Realistic Texture in Image Super-resolution by Deep Spatial Feature Transform", CVPR, 2018, pp. 606-615. (10 pages total).
(Continued)

*Primary Examiner* — Dov Popovici
(74) *Attorney, Agent, or Firm* — Sughrue Mion, PLLC

(57) ABSTRACT

A display device for performing image processing by using a neural network including a plurality of layers, may obtain a plurality of pieces of model information respectively corresponding to pixels included in a first image based on object features respectively corresponding to the pixels; identify the plurality of pieces of model information respectively corresponding to the plurality of layers and the pixels input to the neural network based on information about a time point at which each of the pixels is processed in the neural network; update parameters of the plurality of layers, based on the plurality of pieces of model information; and obtain a second image by processing the first image via the plurality of layers to which the updated parameters are applied; and display the second image.

20 Claims, 11 Drawing Sheets

(56) References Cited

U.S. PATENT DOCUMENTS

| | | | |
|---|---|---|---|
| 11,272,074 B2 | 3/2022 | Achiwa et al. | |
| 11,574,385 B2* | 2/2023 | Cho | G06T 3/4053 |
| 2019/0251391 A1 | 8/2019 | Kawabayashi | |
| 2020/0247138 A1 | 8/2020 | Furukawa et al. | |
| 2020/0311491 A1* | 10/2020 | Szegedy | G06N 3/084 |
| 2021/0142448 A1 | 5/2021 | Yao et al. | |
| 2021/0295473 A1 | 9/2021 | Yu et al. | |
| 2022/0076375 A1 | 3/2022 | Lee et al. | |
| 2022/0164923 A1 | 5/2022 | Lee et al. | |

FOREIGN PATENT DOCUMENTS

| | | |
|---|---|---|
| JP | 2020-140563 A | 9/2020 |
| JP | 2021-135822 A | 9/2021 |
| JP | 7208713 B2 | 1/2023 |
| KR | 10-2018-0071947 A | 6/2018 |
| KR | 10-2018-0126220 A | 11/2018 |
| KR | 10-2020-0047307 A | 5/2020 |
| KR | 10-2020-0135102 A | 12/2020 |
| KR | 10-2245501 B1 | 4/2021 |
| KR | 10-2021-0055583 A | 5/2021 |

OTHER PUBLICATIONS

Kim et al., "Semantic Image Segmentation Combining Image-level and Pixel-level Classification", Dec. 2018, Journal of Korea Multimedia Society vol. 21, Issue 12, 7 pages total.

Communication issued Sep. 11, 2024 by the European Patent Office in European Patent Application No. 22878682.8.

* cited by examiner

| TIME POINT/ LAYER | FIRST LAYER | SECOND LAYER | THIRD LAYER |
|---|---|---|---|
| T1 | A | – | – |
| T2 | A | A | – |
| T3 | B | A | A |
| T4 | B | B | A |
| T5 | B | B | B |
| T6 | C | B | B |

DISPLAY DEVICE AND OPERATING METHOD OF THE SAME

CROSS-REFERENCE TO RELATED APPLICATIONS

This application claims priority from International Patent Application No. PCT/KR2022/010800 filed on Jul. 22, 2022, which claims priority from Korean Patent Application No. 10-2021-0133450 filed on Oct. 7, 2021, in the Korean Intellectual Property Office, the disclosures of which are incorporated herein by reference in their entireties.

BACKGROUND

1. Field

Various embodiments relate to a display device and an operating method thereof. More particularly, various embodiments relate to a display device for performing image processing by using a neural network, and an operating method thereof.

2. Description of the Related Art

Recently, various types of learning-based image processing methods (for example, upscaling) are vigorously developed in line with progress in deep learning technology. For example, a learning-based upscaling method refers to transforming and extending a low-quality, low-resolution image into a high-quality, high-resolution image by using a large-capacity, high-complexity network which has parameter values that are determined through learning. The network used may be designed in various structures, and may be selected according to a system by adjusting the depth of the network (the number of layers) and the number of calculation parameters of the network (the size of a filter kernel). The learning-based upscaling method exhibits superior image restoration performance compared to existing signal processing-based or interpolation-based upscaling methods (e.g., Bicubic interpolation, Bilinear interpolation, and Lanczos interpolation). However, the structure of a single input and a single output shows limitations with respect to specialized restoration for respective objects having various features in an image. For example, classes of objects included in an image may include people, characters, graphics, artifacts (buildings, sculptures, cars, etc.), natural objects (animals, plants, etc.), and the different classes of objects are structurally distinguished from each other. It is difficult to perform learning by distinguishing features of the objects through a single network, and even when complex training data is used, the features of each object are not reflected in the learning process of the network but the network is trained to minimize the overall error. Thus, there is a problem in that the trained network outputs a target image of average image quality.

SUMMARY

According to the disclosed embodiments, a display device for modifying parameters of respective layers of a neural network based on features of objects included in an image and performing image processing by using the modified parameters, and an operating method of the display device may be provided.

According to an aspect of the disclosure, a display device for performing image processing by using a neural network including a plurality of layers, may include a display; a memory storing one or more instructions; and a processor configured to execute the one or more instructions stored in the memory to: obtain a plurality of pieces of model information respectively corresponding to pixels included in a first image based on object features respectively corresponding to the pixels; identifying plurality of pieces of model information respectively corresponding to the plurality of layers and the pixels input to the neural network based on information about a time point at which each of the pixels is processed in the neural network; update parameters of the plurality of layers, based on the plurality of pieces of model information; obtain a second image by processing the first image via the plurality of layers to which the updated parameters are applied; and control the display to display the second image.

The information about the time point may include at least one of information about a data input time at which each of the pixels is input to each of the plurality of layers or information about a data processing time at which each of the pixels is processed in each of the plurality of layers.

At least one of the data input time or the data processing time may have a predetermined period.

The information about the time point may be determined based on location of each of the pixels in the first image.

The plurality of layers may be connected in series, and the processor may be further configured to sequentially input each pixel value of the pixels included in the first image to the plurality of layers.

The plurality of layers may include a first layer and a second layer that follows the first layer, and the pixels of the first image may include a first pixel and a second pixel. The processor may be further configured to execute the one or more instructions to: update a parameter of the first layer to a parameter included in first model information corresponding to the first pixel based on a first pixel value of the first pixel that is input to the first layer; and update the parameter of the first layer to a parameter included in second model information corresponding to the second pixel and update a parameter of the second layer to a parameter included in the first model information, based on the first pixel value of the first pixel input to the second layer and a second pixel value of the second pixel input to the first layer.

The pixels of the first image may further include a third pixel that follows the second layer, and the processor may be further configured to execute the one or more instructions to update the parameter of the first layer to a parameter included in third model information corresponding to the third pixel, update the parameter of the second layer to a parameter included in the second model information, and update a parameter of a third layer to a parameter included in the first model information, based on the first pixel value of the first pixel input to the third layer, the second pixel value of the second pixel input to the second layer, and a third pixel value of the third pixel input to the first layer.

The processor may be further configured to execute the one or more instructions to: detect object regions included in the first image; and obtain the plurality of pieces of model information respectively corresponding to the pixels included in the first image based on the object regions respectively corresponding to the pixels included in the first image.

The processor may be further configured to execute the one or more instructions to obtain a plurality of pieces of adjusted model information respectively corresponding to the pixels based on a weighted sum of the plurality of pieces of model information corresponding to the object regions.

The processor may be further configured to execute the one or more instructions to: determine weights of the plurality of pieces of model information respectively corresponding to the object regions based on a distance between a first pixel included in the first image and a center of each of the object regions; and obtain adjusted model information corresponding to the first pixel, among the plurality of pieces of adjusted model information, based on the plurality of pieces of model information respectively corresponding to the object regions and the determined weights.

According to an aspect of the disclosure, there is provided an operating method of a display device for performing image processing by using a neural network including a plurality of layers. The operating method may include: receiving a first image; obtaining a plurality of pieces of model information respectively corresponding to pixels included in the first image based on object features respectively corresponding to the pixels; identifying the plurality of pieces of model information respectively corresponding to the plurality of layers and the pixels input to the neural network, based on information about a time point at which each of the pixels is processed in the neural network; updating parameters of the plurality of layers based on the plurality of pieces of model information; generating a second image by processing the first image via the plurality of layers to which the updated parameters are updated; and displaying the second image.

The information about the time point may include at least one of information about a data input time at which each of the pixels is input to each of the plurality of layers or information about a data processing time at which each of the pixels is processed in each of the plurality of layers.

At least one of the data input time or the data processing time point has a uniform period.

The information about the time point may be determined based on location of each of the pixels in the first image.

The plurality of layers may be connected in series, and pixel values of the plurality of pixels included in the first image may be sequentially input to the plurality of layers and sequentially output.

The plurality of layers may include a first layer and a second layer that follows the first layer, and the pixels of the first image may include a first pixel and a second pixel. The updating of the respective parameters of the plurality of layers may include: updating a parameter of the first layer to a parameter included in first model information corresponding to the first pixel based on a first pixel value of the first pixel that is input to the first layer; and updating the parameter of the first layer to a parameter included in second model information corresponding to the second pixel and updating a parameter of the second layer to a parameter included in the first model information, based on the first pixel value of the first pixel input to the second layer and a second pixel value of the second pixel input to the first layer.

The pixels of the first image may further include a third pixel that follows the second layer. The updating of the respective parameters of the plurality of layers may include updating the parameter of the first layer to a parameter included in third model information corresponding to the third pixel, updating the parameter of the second layer to a parameter included in the second model information, and updating a parameter of a third layer to a parameter included in the first model information, based on the first pixel value of the first pixel input to the third layer, the second pixel value of the second pixel input to the second layer, and a third pixel value of the third pixel input to the first layer.

The operating method may further include detecting object regions included in the first image. The obtaining of the plurality of pieces of model information respectively corresponding to the pixels may include obtaining the plurality of pieces of model information respectively corresponding to the pixels included in the first image based on the object regions respectively corresponding to the pixels included in the first image.

The obtaining of the plurality of pieces of model information respectively corresponding to the pixels may include obtaining a plurality of pieces of adjusted model information respectively corresponding to the pixels based on a weighted sum of the plurality of pieces of model information corresponding to the object regions.

The obtaining of the plurality of pieces of model information respectively corresponding to the pixels may include: determining a weights of the plurality of pieces of model information respectively corresponding to the object regions based on a distance between a first pixel included in the first image and a center of each of the object regions; and obtaining adjusted model information corresponding to the first pixel, among the plurality of pieces of adjusted model information, based on the plurality of pieces of model information respectively corresponding to the object regions and the determined weights.

According to an aspect of the disclosure, there is provided a non-transitory computer-readable recording medium having stored therein a program including instructions causing to execute a method of performing image processing via a neural network including a plurality of layers. The method may include obtaining a first image; obtaining a plurality of pieces of model information respectively corresponding to pixels included in the first image based on object features respectively corresponding to the pixels; identifying the plurality of pieces of model information respectively corresponding to the plurality of layers and the pixels input to the neural network, based on information about a time point at which each of the pixels is processed in the neural network; updating parameters of the plurality of layers based on the plurality of pieces of model information; and generating a second image by processing the first image via the plurality of layers to which the updated parameters are updated.

A display device according to an embodiment of the disclosure may obtain object features according to regions and pixels based on objects included in an image and perform image processing by using model information that varies according to the object features for each region and each pixel. Accordingly, accuracy or performance of image processing may be improved.

According to a display device of an embodiment of the disclosure, all parameters included in an image processing network may not be updated based on the same model information but parameters may be updated for each layer, and thus delay of image processing may be prevented.

DETAILED DESCRIPTION

Figure 1:
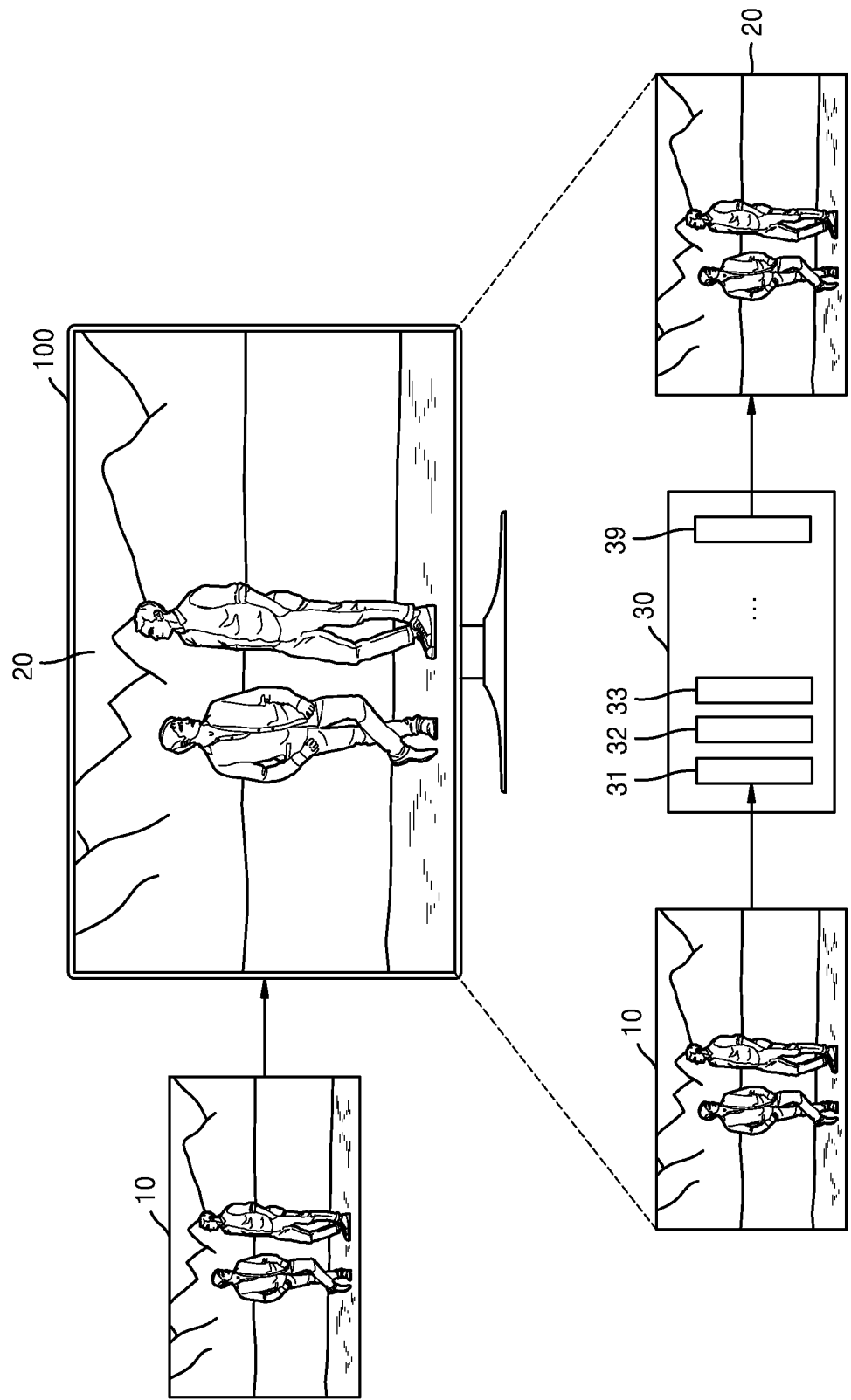
FIG. 1 is a view illustrating a display device according to an embodiment of the disclosure.

Throughout the disclosure, the expression "at least one of a, b or c" indicates only a, only b, only c, both a and b, both a and c, both b and c, all of a, b, and c, or variations thereof.

Hereinafter, the terms used in the present specification will be briefly described, and then the disclosure will be described in detail.

The terms used in this specification are those general terms currently widely used in the art in consideration of functions in regard to the disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the specification should be understood not as simple names but based on the meaning of the terms and the overall description of the disclosure.

Throughout the specification, when a part may "include" a certain constituent element, unless specified otherwise, it may not be construed to exclude another constituent element but may be construed to further include other constituent elements. The terms such as "unit", "module" described in the specification or the like refer to units that perform at least one function or operation, and the units may be implemented as hardware or software or as a combination of hardware and software.

Hereinafter, embodiments of the disclosure will be described more fully with reference to the accompanying drawings, in which the embodiments of the disclosure are shown such that one of ordinary skill in the art may easily work the disclosure. This disclosure may, however, be embodied in many different forms and should not be construed as limited to the embodiments of the disclosure set forth herein. Also, elements not related to description are omitted in the drawings for clear description of the disclosure, and like reference numerals in the drawings denote like elements throughout the specification.

In the embodiments of the present specification, the term "user" may refer to a person who controls a system, function or operation, and may include a developer, a manager or an installation engineer.

In the embodiments of the present specification, the term "image" or "picture" may refer to a still image, a moving image composed of a plurality of continuous still images (or frames), or a video.

The term "model information" may refer to parameters of a neural network of a model, such as weights applied to neurons of the neural network to be multiplied with inputs to the neuron, a bias applied to each neuron, and the like.

FIG. 1 is a view illustrating a display device according to an embodiment of the disclosure.

Referring to FIG. 1, a display device 100 according to an embodiment of the disclosure may be an electronic device that receives an image and performs image processing on the received image. The image processing may include upscaling, image quality processing, or the like, but is not limited thereto.

For example, the display device 100 may be implemented in various forms such as a TV, a mobile phone, a tablet PC, a digital camera, a camcorder, a laptop computer, a desktop computer, an e-book terminal, a digital broadcasting terminal, a personal digital assistant (PDA), a portable multimedia player (PMP), a navigation device, an MP3 player, a wearable device, and the like.

Also, the display device 100 may include a display and display, on the display, an image on which image processing is performed. In addition, the display device 100 may be a stationary electronic device arranged at a fixed position or a mobile electronic device in a portable form, or a digital broadcasting receiver capable of receiving a broadcast. In particular, embodiments may be easily implemented in an image processing device having a large display, such as a TV, but are not limited thereto.

The display device 100 according to an embodiment of the disclosure may perform processing such as upscaling of an image 10 received or input from an external device or an external server or improving the image quality of the image 10. The display device 100 may display an upscaled image or an image with an improved image quality. The display device 100 may input the input image 10 to an image processing network 30, and perform a calculation in each of a plurality of layers included in the image processing network 30 to obtain an output image 20 that is upscaled or has an improved image quality.

The image processing network 30 according to an embodiment of the disclosure may include a structure in which first to nth layers 31, 32, 33, . . . , 39 are serially connected. Accordingly, data input to the first layer 31 is processed by a calculation with a parameter of the first layer 31 and a processing result thereof is input to the second layer 32. In addition, data input to the second layer 32 is processed by a calculation with a parameter of the second layer 32 and a processing result thereof is input to the third layer 33. As described above, as data input to the first layer 31 may be sequentially processed in each of the first to nth layers 31, 32, 33, . . . , and 39, final data may be output from the nth layer 39.

The input image 10 according to an embodiment of the disclosure may be input to the image processing network 30 in units of regions. For example, the input image 10 may be input to the image processing network 30 in units of certain regions each including each of pixels included in the input image 10 as a center pixel. According to an embodiment of the disclosure, an operation of inputting the input image 10 to the image processing network 30 may refer to an operation of inputting the input image 10 to the first layer 31 of the image processing network 30.

A size of a region in the input image 10 to be input may be determined based on a size of a parameter (filter kernel) of the first layer 31. For example, when a size of a parameter of the first layer 31 is 3×3, to perform a calculation between a region input to the first layer 31 and the parameter, a size of the region input to the first layer 31 may be 3×3. However, the disclosure is not limited thereto.

The input image 10 may include one or more objects. The input image 10 may have features that are distinguished from each other according to object regions according to classes of objects included in the input image 10, and a model optimized for image processing varies according to object regions included in the input image 10. Accordingly, the display device 100 according to an embodiment of the disclosure may obtain object features according to regions and pixels based on objects included in the input image 10, and may perform image processing by using model information that differs according to object features 0 for each region and pixel.

The display device 100 may perform image processing by using model information that differs according to regions and pixels in the input image 10, and the image processing will be described in further detail with reference to FIG. 2.

Figure 2:
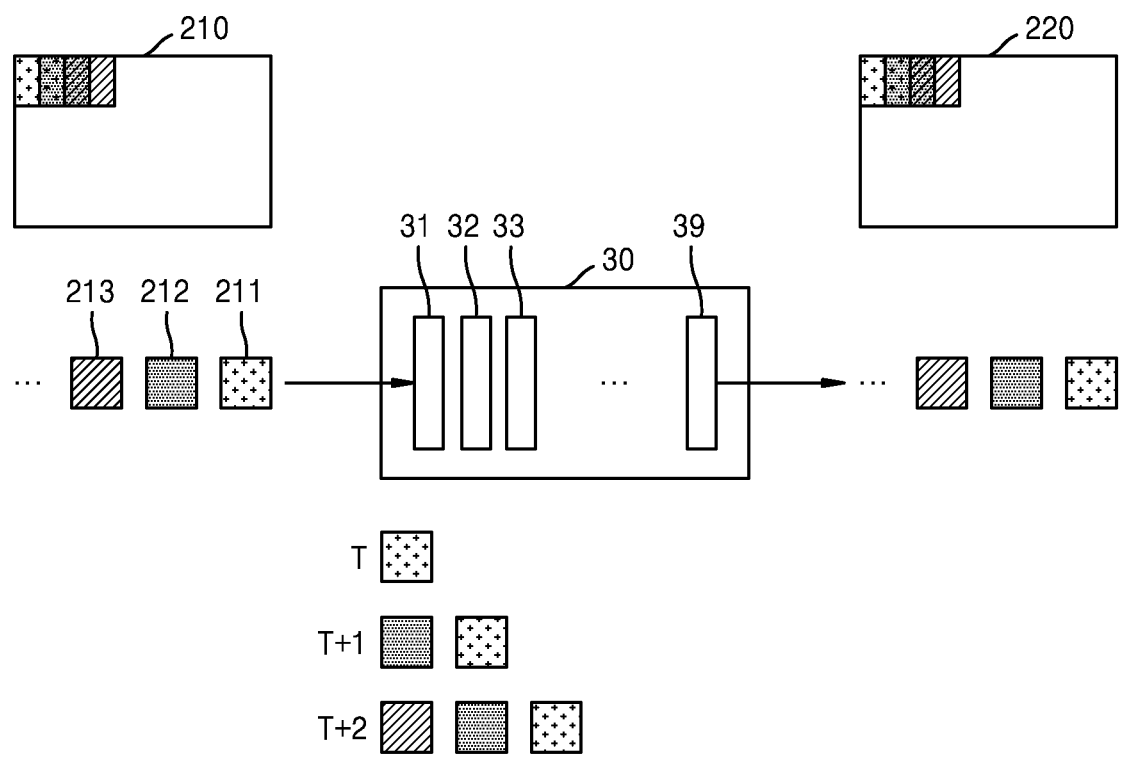
FIG. 2 is a diagram illustrating a structure of an image processing network according to an embodiment of the disclosure.

FIG. 2 is a diagram illustrating a structure of an image processing network according to an embodiment of the disclosure.

Referring to FIG. 2, the image processing network 30 may include a structure in which a plurality of layers are serially connected. For example, the plurality of layers may include first to nth layers 31, 32, 33, . . . , 39.

A first image 210 may be input to the image processing network 30 in units of regions. For example, a first region 211, a second region 212, and a third region 213 of the first image 210 may be sequentially input to the image processing network 30. The first region 211 or a center pixel of the first region 211 may have a first object feature (for example, a "face" feature), and the second region 212 or a center pixel of the second region 212 may have a second object feature (for example, a "text" feature). Also, the third region 213 or a center pixel of the third region 213 may have a third object feature (for example, a "background" feature).

In this case, the display device 100 may perform image processing on the first to third regions 211, 212, and 213 by using different model information according to object features, instead of the same model information, thus improving the accuracy or performance of image processing.

To perform image processing using different model information according to object features for each region, the display device 100 may obtain model information corresponding to object features of an input region, and update parameters of a plurality of layers included in the image processing network 30 according to the model information.

Here, when the display device 100 simultaneously updates parameters of all of the plurality of layers included in the image processing network 30, a delay with respect to a next region occurs until input regions are sequentially processed in the first to nth layers 31, 32, 33, . . . , 39. For example, when the image processing network 30 processes the first region 211, all of parameters of the first to nth layers 31, 32, 33, . . . , 39 of the image processing network 30 are simultaneously updated based on first model information corresponding to a first object feature of the first region 211. While the image processing network 30 processes the first region 211, the image processing network 30 may not able to process the second region 211 until image processing on the first region 211 is completed in the first to nth layers 31, 32, 33, . . . , 39.

Accordingly, there is a delay in image processing of a currently input region until image processing of a previously input region is completed. Also, the more the number of layers included in the image processing network 30 (as a depth of the network increases), the delay time increases.

Accordingly, the display device 100 according to an embodiment of the disclosure may update parameters for each layer based on model information corresponding to a region input to the image processing network 30, instead of updating all parameters included in the image processing network 30, based on the same model information. The display device 100 may obtain model information of a region input to a corresponding layer in each of the layers, and update parameters for each layer based on the obtained model information.

The display device 100 according to an embodiment of the disclosure may update parameters of a plurality of layers included in the image processing network 30 based on model information for each region (per pixel) of an input image and time point information processed by the image processing network 30 for each region (per pixel).

Regions of an image input to the image processing network 30 are processed and output in the order in which they are input to the image processing network 30. For example, regions of the first image 210 are input to the first layer 31, and sequentially processed in the first to nth layers 31, 32, 33, . . . , 39 in a pipeline manner, and output from the nth layer 39.

Accordingly, a region processed in a K-th layer at time T is processed in a K+1-th layer at time T+1, and thus, a parameter of the K+1-th layer at time T+1 may be updated based on model information of the K-th layer at time T (previous time point).

For example, as illustrated in FIG. 2, when the first region 211, the second region 212, and the third region 213 of the first image are sequentially input to the image processing network 30, and the first region 211 is processed in the first layer 31 at time T, then, at time T+1, the first region 211 is processed in the second layer 32 which is a next layer of the first layer 31, and the second region 212 is processed in the first layer 31. In addition, at time T+2, the first region 211 is processed in the third layer 33 that is a next layer of the second layer 32, and the second region 212 is processed in the second layer 32, and the third region 213 is processed in the first layer 31.

Accordingly, a parameter of the first layer 31 may be updated at time T based on the first model information corresponding to the first region 211. In addition, at time T+1, the parameter of the first layer 211 may be updated based on second model information corresponding to the second region 212, and a parameter of the second layer 212 may be updated based on the first model information. Also, at time T+2, the parameter of the first layer 31 may be updated based on third model information corresponding to the third region 213, and the parameter of the second layer 212 may be updated based on the second model information, and a parameter of the third layer 213 may be updated based on the first model information.

Also, the display device 100 according to an embodiment of the disclosure may perform a calculation based on parameters updated in each of the layers, and may input resultant values obtained by the calculation in each of the layers to a next layer. The display device 100 may obtain a second image 220 by processing the first image 210 by repeating a parameter update operation and a calculation operation in each of the layers at every preset period.

Hereinafter, a method of updating parameters of a plurality of layers, by a display device according to an embodiment of the disclosure, will be described in detail with reference to the drawings.

Figure 3:
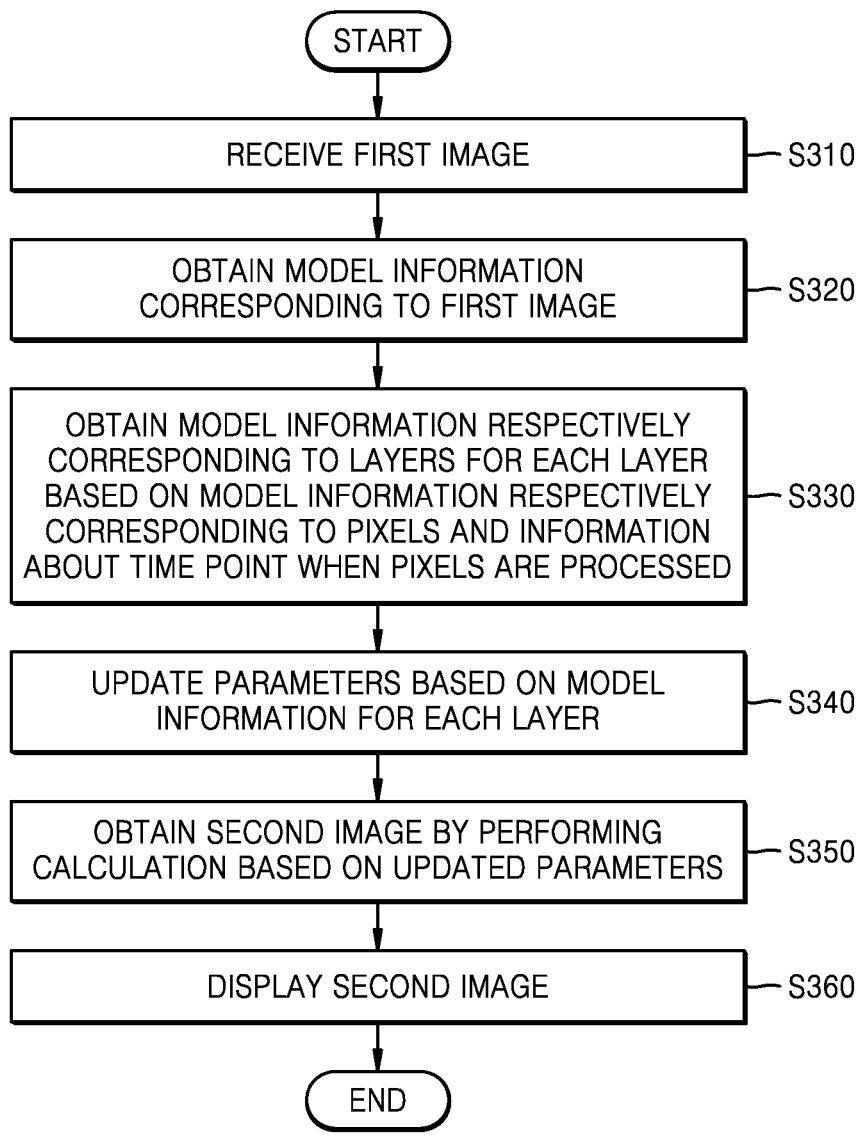
FIG. 3 is a flowchart of an operating method of a display device, according to an embodiment of the disclosure.

FIG. 3 is a flowchart of an operating method of a display device, according to an embodiment of the disclosure.

Referring to FIG. 3, the display device 100 according to an embodiment of the disclosure may receive a first image (operation S310). For example, the display device 100 may receive the first image from an external device or an external server.

The display device 100 according to an embodiment of the disclosure may obtain model information corresponding to the received first image (operation S320).

The display device 100 may extract object features respectively corresponding to pixels included in the first image, and may obtain model information respectively corresponding to the pixels based on the object features. For example, the display device 100 may detect one or more objects included in the first image, and determine one or more object regions based on the detected objects. Here, the display device 100 may use a method of expressing a detected object region included in the first image by using a bounding box (square) and a segmentation method of expressing a detected object region in units of pixels. However, the disclosure is not limited thereto.

When one or more object regions are determined, the display device 100 may determine model information corresponding to object features of the object regions as model information corresponding to pixels included in the object regions. For example, the display device 100 may allocate model information corresponding to a face feature, to pixels included in a "face" region detected from the first image. In addition, the display device 100 may allocate model information corresponding to a text feature to pixels included in a "text" region.

The display device 100 may obtain model information respectively corresponding to the pixels included in the first image in the above-described manner.

While it has been described above that the model information is obtained for each pixel, the disclosure is not limited thereto, and the model information may be obtained for each region of the first image that includes more than one pixel.

Also, the display device 100 may obtain model information of each pixel included in the first image based on a weighted sum of pieces of model information respectively corresponding to object regions detected from the first image. For example, the display device 100 may determine a weight of model information corresponding to an object region detected from the first image based on a distance between a first pixel included in the first image and a center of the object region detected from the first image. The display device 100 may obtain model information of the first pixel based on the determined weight. This will be described in detail later with reference to FIGS. 9 and 10.

The display device 100 according to an embodiment of the disclosure may obtain model information respectively corresponding to layers for each layer based on model information respectively corresponding to pixels and information on a time point when each of the pixels is processed by an image processing network (operation S330).

The display device 100 may obtain model information respectively corresponding to layers for each layer based on parameter update information in which pixel information included in a first image, model information corresponding to pixels, and time point information corresponding to the pixels are mapped to each other. The time point information corresponding to the pixel may indicate a time point when a region having the pixel as a center pixel is input to a first layer of the image processing network or a time point when a region input to the first layer is processed in the first layer.

The display device 100 may obtain model information corresponding to the first layer based on a time point when a region having each of the pixels as a center pixel is input to the first layer of the image processing network and model information of each of the pixels.

In addition, with respect to the remaining layers except for the first layer of the image processing network, the display device 100 may obtain model information corresponding to the remaining layers based on model information used for parameter setting of a previous layer at a previous time point.

The display device 100 according to an embodiment of the disclosure may update parameters of respective layers based on model information obtained for each layer (operation S340).

The display device 100 may update a parameter of the first layer to a parameter included in the first model information corresponding to the first region, based on the first region of the first image, input to the first layer, and update the parameter of the first layer to a parameter included in the second model information corresponding to the second region and update a parameter of a second layer to a parameter included in the first model information, based on the first region input to the second layer which is a next layer of the first layer and the second region input to the first layer.

In addition, based on the first region input to a third layer which is a next layer of the second layer, the second region input to the second layer, and a third region input to the first layer, the parameter of the first layer may be updated to a parameter included in third model information corresponding to the third region, the parameter of the second layer may be updated to a parameter included in the second model information, and a parameter of the third layer may be updated to a parameter included in the first model information.

The display device 100 according to an embodiment of the disclosure may obtain a second image by performing a calculation on each of a plurality of layers based on the updated parameter (operation S350).

For example, the display device 100 may perform a calculation in each of the plurality of layers based on the updated parameter, and may input a result of the calculation to a next layer. The display device 100 may obtain the second image by repeating a parameter update operation and a calculation operation in each of the plurality of layers at every preset period.

The display device 100 according to an embodiment of the disclosure may display the obtained second image (operation S360).

Figure 4:
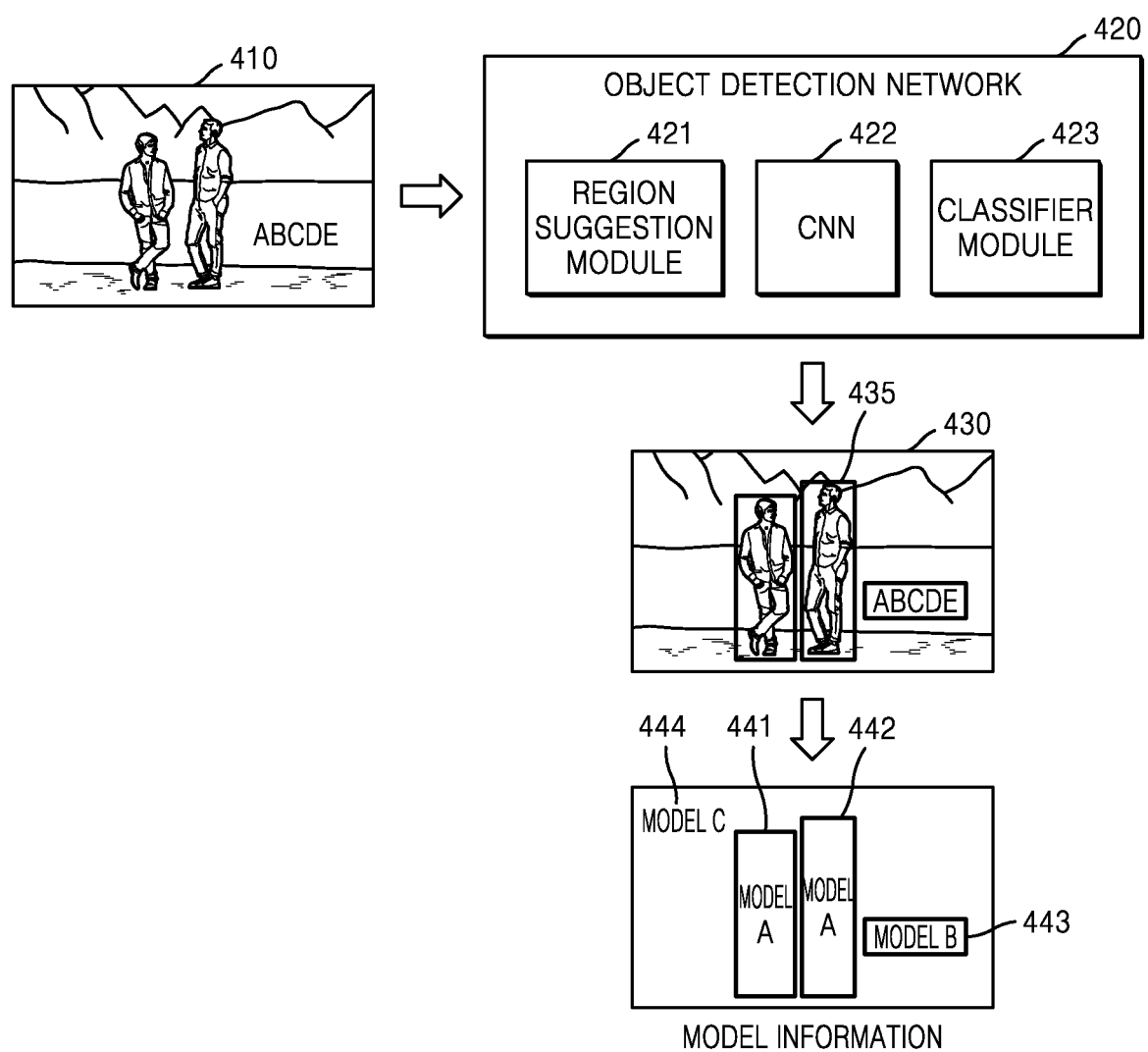
FIG. 4 is a diagram for describing a method, performed by a display device according to an embodiment of the disclosure, of obtaining model information corresponding to a first image.

FIG. 4 is a diagram for describing a method, performed by a display device according to an embodiment of the disclosure, of obtaining model information corresponding to a first image.

Referring to FIG. 4, according to an embodiment of the disclosure, the display device 100 may include an object detection module. The object detection module according to an embodiment of the disclosure may include an appropriate logic, circuitry, interface, and/or code that is operated to detect an object from a first image 410.

As illustrated in FIG. 4, the object detection module according to an embodiment of the disclosure may identify objects included in an image and obtain class, size, location information, etc. of the identified objects by using an object detection network 420.

The object detection network 420 according to an embodiment of the disclosure may be a neural network that receives an image and detects at least one object included in the input image. The object detection network 420 may detect one or more objects from the first image 410 by using one or more neural networks, and may output object information including an object class and an object location corresponding to the detected one or more objects.

Here, object detection includes determining where objects are located in a given image (object localization) and determining which category each object belongs to (object classification). Thus, the object detection network 420 may typically include three operations, namely, selecting an object candidate region, extracting a feature from each candidate region, and applying a classifier to the extracted feature to classify a class of the object candidate region. Depending on the detection method, localization performance may be improved through post-processing such as bounding box regression.

The object detection network 420 according to an embodiment of the disclosure may be a deep neural network (DNN) having a plurality of internal layers performing a calculation, or a convolutional neural network (CNN) including convolutional layers performing a convolution operation as internal layers, but is not limited thereto.

Referring to FIG. 4, the object detection network 420 according to an embodiment of the disclosure may include a region suggestion module 421, a CNN 422, and a classifier module 423.

The region suggestion module 421 may extract a candidate region from the first image 410. The candidate region may be limited to a preset number, but is not limited thereto.

The CNN 422 may extract feature information from a region generated by the region suggestion module 421.

The classifier module 423 may receive the feature information extracted from the CNN 422 as an input and perform classification.

In order for a neural network to accurately output result data corresponding to input data, it is necessary to train the neural network according to the purpose. Here, 'training' may refer to training a neural network so that the neural network may discover or learn by itself a method of inputting various types of data into the neural network and analyzing the input data, a method of classifying the input data, and/or a method of extracting features necessary for generating resultant data from the input data, or the like. In detail, through a training process, a neural network may optimize and set weight values in the neural network by training learning data (for example, a plurality of different images). Then, a desired result is output by self-learning input data through a neural network which has an optimized weight value.

For example, through training, weight values included in the object detection network 420 may be optimized such that the object detection network 420 detects at least one object included in an image input to the object detection network 420. In this case, the object detection network 420 may be trained to detect various types of object information, such as a face (person), text, artifact, and natural object (background), from an image.

Accordingly, the object detection network 420 which has completed training may receive an image, detect at least one object included in the image, and output a detected result. For example, the object detection network 420 may detect various types of object regions, such as a face (person), text, artifact, and natural object (background), included in the first image 410.

As illustrated in FIG. 4, an image 430 output from the object detection network 420 may include information about an object detected from the input first image 410. Information about an object may include information about a class of a detected object and a bounding box 435 indicating a location of the detected object. However, the information about an object is not limited thereto, and objects detected from the first image 410 input in various manners may be output on the output image 430.

While a detected object region is illustrated as a square-shaped bounding box in FIG. 4, the disclosure is not limited thereto.

An object detection module according to an embodiment of the disclosure may segment a first image in units of pixels and detect an object region based on segmented regions. In this case, object regions of various forms may be detected.

The display device 100 according to an embodiment of the disclosure may obtain model information corresponding to the first image 410 based on object features of detected object regions. For example, model A corresponding to face features may be allocated to pixels included in a first object region 441 and a second object region 442. Also, model B corresponding to text features may be allocated to pixels included in a third object region 443, and model C corresponding to background features may be allocated to pixels included in a fourth object region 444.

Figure 5:
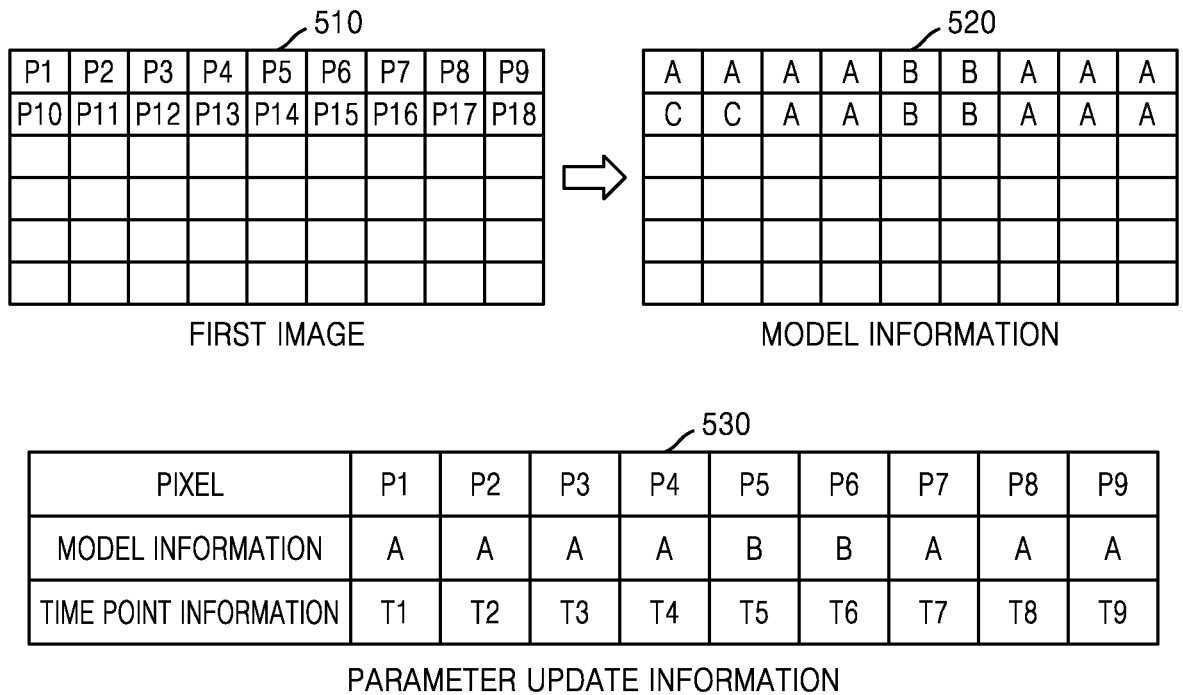
FIG. 5 illustrates information about a time point when model information for each of pixels and the pixels are processed in an image processing network, according to an embodiment of the disclosure.

FIG. 5 illustrates information about a time point when model information for each of pixels and the pixels are processed in an image processing network, according to an embodiment of the disclosure.

Referring to FIG. 5, the display device 100 according to an embodiment of the disclosure may obtain model information 520 respectively corresponding to pixels included in a first image 510. The method of obtaining the model information 520 is described in detail with reference to FIG. 4, and thus, detailed descriptions thereof will be omitted.

Also, the display device 100 according to an embodiment of the disclosure may obtain information about a time point when each pixel included in the first image is processed by the image processing network 30 according to an embodiment of the disclosure (time point information). The time point information may include information about a time point when a region including, as a center pixel, the pixels included in the first image is input to the image processing network 30. For example, as illustrated in FIG. 5, a time point when a first region having a first pixel P1 as a center pixel is input to the image processing network 30 may be T1, and a time point when a second region including a second pixel P2 as a center pixel is input to the image processing network 30 may be T2.

Alternatively, time point information according to an embodiment of the disclosure may include information about a time point when a region having each of the pixels included in the first image as a center pixel is input to the first layer, or information about a time point when a calculation between a region including, as a center pixel, each of the pixels included in the first image, with a parameter in the first layer, or the like. However, the disclosure is not limited thereto.

Also, the time point information may be determined based on an order in which each of regions included in the first image 510 is input to the image processing network 30, a period at which each region is input, a period at which each region is processed in each layer, and the like.

For example, when time point information is information about time points when regions are input to the image processing network 30, and a first region and a second region are input to the image processing network 30 in the order, and the (first and second regions are input to the image processing network 30 at a period P0, the time point information T2 of the second region may be determined to be T1 (time point information of the first region)+P0.

In addition, when time point information is information about a time point when regions are processed in the first layer 31, and the first region and the second region are input to the image processing network in the order, and a calculation between an input region and a parameter is performed in the first layer at a period P1, the time point information T2 of the second region may be determined to be T1 (time point information of the first region)+P1.

The display device 100 according to an embodiment of the disclosure may obtain parameter update information 530 in which each pixel is mapped to corresponding model information 520 and corresponding time point information. The parameter update information 530 according to an embodiment of the disclosure may appear in various forms.

Figure 6:
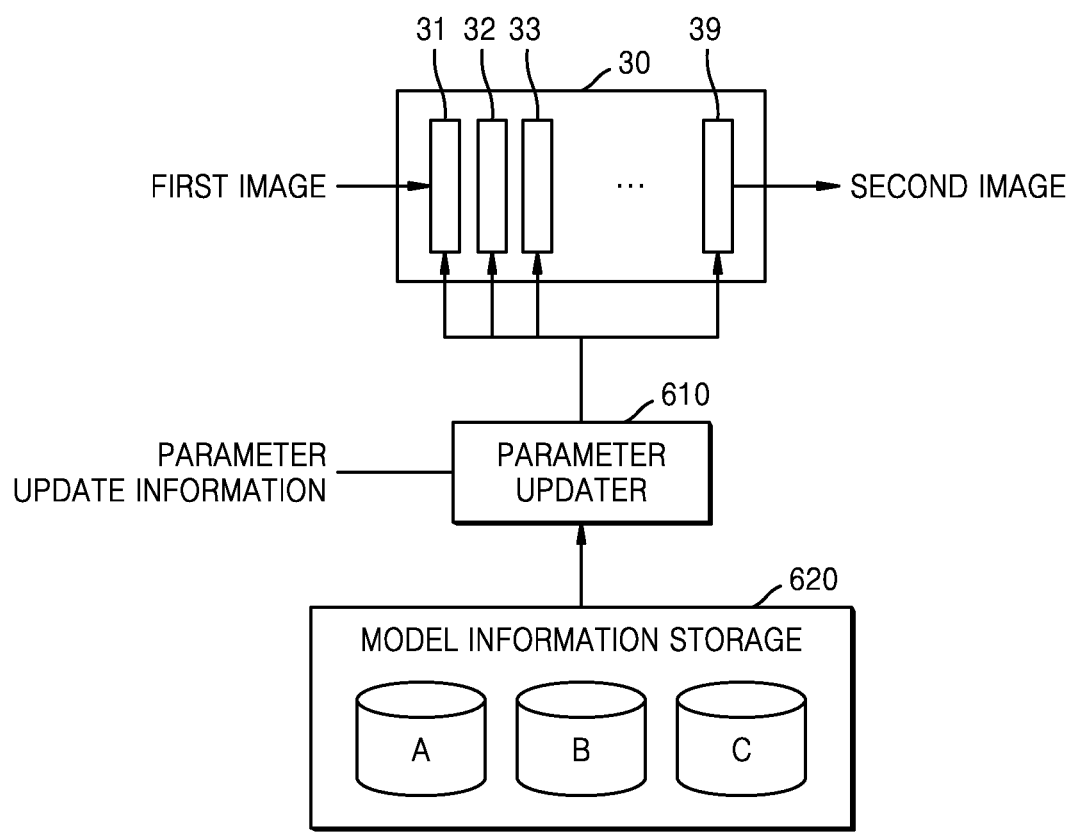
FIGS. 6 and 7 are diagrams for describing a method, performed by a display device according to an embodiment of the disclosure, of updating a parameter of an image processing network based on parameter update information.
Figure 7:
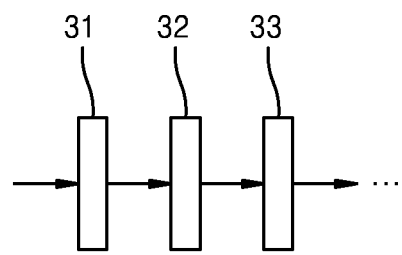

FIGS. 6 and 7 are diagrams for describing a method, performed by a display device according to an embodiment of the disclosure, of updating a parameter of an image processing network based on parameter update information.

Referring to FIG. 6, the display device 100 according to an embodiment of the disclosure may include a parameter updater 610 and a model information storage (e.g., a memory) 620.

The parameter updater 610 according to an embodiment of the disclosure may include an appropriate logic, circuitry, interface, and/or code that is operated to update parameters of a plurality of respective layers included in the image processing network 30 based on the parameter update information.

The parameter updater 610 according to an embodiment of the disclosure may determine model information respectively corresponding to layers for each layer based on model information for each pixel included in the parameter update information. The parameter updater 610 may obtain the determined model information from the model information storage 620 and update the parameters of the layers.

The model information storage 620 may store a plurality of pieces of model information received from an external device or an external server. The plurality of pieces of model information may be parameter information of an image processing network that has been trained, wherein the parameter information is obtained by training the image processing network by using training image sets having different object characteristics. A method of obtaining a plurality of pieces of model information will be described later in detail with reference to FIG. 8.

A clock signal for inputting a pixel value of a region or pixel to the image processing network 30 according to an embodiment of the disclosure, a clock signal applied to the image processing network 30, and a clock signal applied to the parameter updater 610 may be synchronized with each other.

The parameter updater 610 may receive parameter update information and update parameters of a plurality of layers based on the parameter update information. This will be described in detail with reference to FIG. 7.

As described with reference to FIG. 5, the parameter update information according to an embodiment of the disclosure may be information in which pixel information, model information corresponding to pixels, and time point information corresponding to the pixels are mapped. The time point information corresponding to a pixel may be a time point when a region having the pixel as a center pixel is input to the first layer 31 or a time point when a region input to the first layer 31 is processed in the first layer 31. The time point information may indicate a data input time or a data processing time of each layer. However, the disclosure is not limited thereto.

The parameter updater 610 according to an embodiment of the disclosure may update a parameter of the first layer 31 based on model information of each of the pixels included in the parameter update information and a time point when a region having each of the pixels as a center pixel is input to the first layer 31.

For example, when the parameter update information according to an embodiment of the disclosure includes information indicating that model information corresponding to the first pixel P1 is model A and that a region having the first pixel P1 as a center is input to the first layer 31 at the time T1, the parameter updater 610 may set, as illustrated in FIG. 7, the parameter of the first layer 31 as a first parameter included in model A based on the time T1.

In addition, when the parameter update information includes information indicating that model information corresponding to the second pixel P2 is model A and that a region having the second pixel P2 as a center is input to the first layer 31 at the time T2, the parameter updater 610 may not update the parameter of the first layer 31 but maintain the same as the first parameter.

In addition, when the parameter update information includes information indicating that model information corresponding to a third pixel P3 is model B and that a region having the third pixel P3 as a center is input to the first layer 31 at a time T3, the parameter updater 610 may update the parameter of the first layer 31 to a second parameter included in model B.

Also, the parameter updater 610 may update parameters of the remaining layers except for the first layer 31, based on model information used to set parameters of previous layers at previous time points.

For example, the parameter updater 610 may set a parameter of the second layer 32 at the time T2 as a third parameter included in model A which is used in setting the parameter of the first layer 31, which is a previous layer, at a previous time point, that is, T1.

Also, a parameter of the second layer 32 at a time T4 may be updated to a fourth parameter included in model B used to set the parameter of the first layer 31 at the previous time point, that is, T3.

Also, the parameter updater 610 may update the parameters of the third layer 31 to the nth layer 39 in the same manner as the second layer 32.

Also, in each of the layers, a calculation between an updated parameter and an input region may be performed.

In an embodiment, model information (e.g., model information A) applied to a previous layer (e.g., the second layer 32) at a previous time point (e.g., T2), may be applied to the following layer (e.g., the third layer 33) at the following time point (e.g., T3). For example, a series of model information (e.g., model information CBBBAA) may be sequentially assigned to the layers (e.g., the first layer 31, the second layer 32, and the third layer 33), starting from the right-most model (e.g., model information A) of the series of model information (e.g., model information CBBBAA), along the time domain. The series of model information may shift forward along the time domain, so that only the right-most model (e.g., model information A) is assigned to the first layer 31 at the time T1, the first two models (model information AA) from the right end of the series of model information are respectively assigned to the first layer 31 and the second layer 32 at the time T2, and the first three models (model information AAB) from the right end of the series of model information are respectively assigned to the first layer 31, the second layer 32, and the third layer 33 at the time T3. The mapping information between the time points, the layers 31-33, and the series of model information is determined and stored in a memory before the layers 31-33 are to be updated, so that corresponding model information are applied to the layers 31-33 according to a data input time or a data processing time without a delay.

Time points according to an embodiment of the disclosure may have a preset period, in which case the period may be determined based on a period at which regions (pixels) are input to the image processing network 30, a period at which the regions are input to and output from the layers, respectively, and a period of time required for calculations conducted in each of the layers, but is not limited thereto.

While the time point information included in the parameter update information is described with reference to FIG. 7, to be a time point when each of the regions is input to the first layer 31, also when the time point information is a time point when each of the regions is processed in the first layer 31, the parameters of the plurality of layers may be updated in the same manner.

As described above, with respect to the plurality of layers included in the image processing network 30, when parameters are updated according to object features of the regions processed in corresponding layers for each layer, the performance of image processing may be improved, and also, delay of image processing may be prevented.

Figure 8:
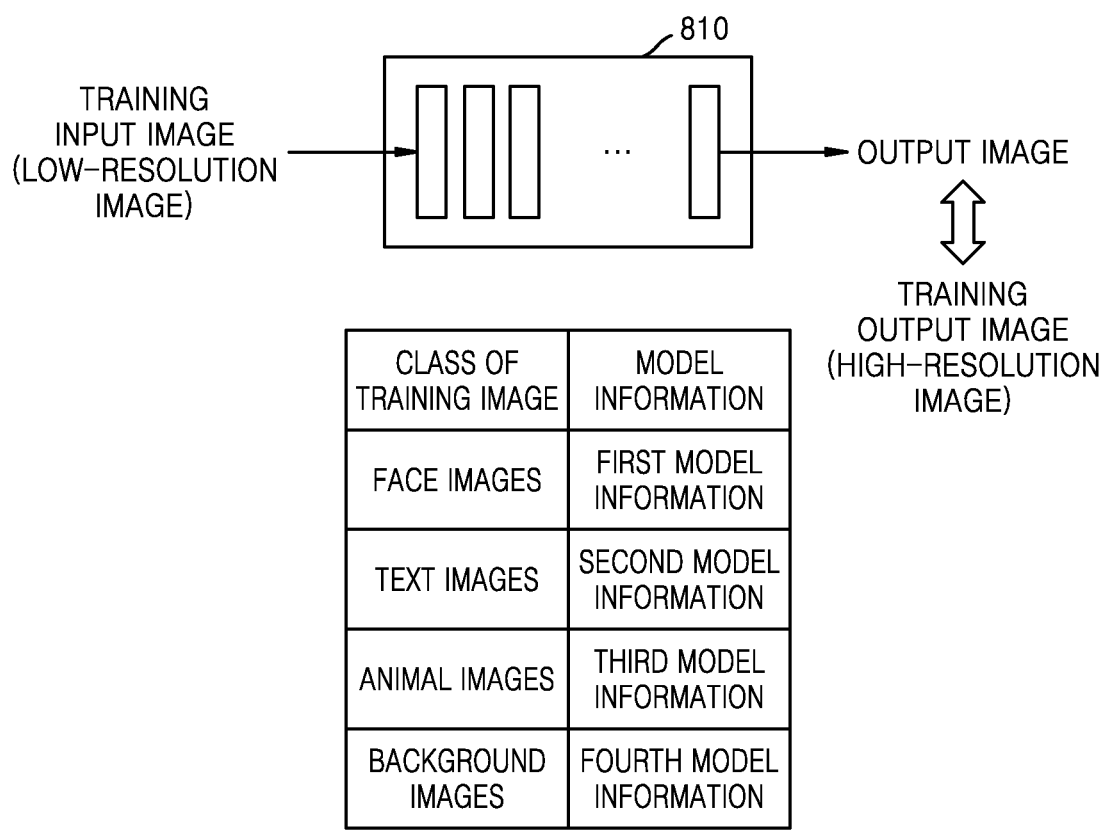
FIG. 8 is a diagram for describing a method of obtaining a plurality of pieces of model information, according to an embodiment of the disclosure.

FIG. 8 is a diagram for describing a method of obtaining a plurality of pieces of model information, according to an embodiment of the disclosure.

Referring to FIG. 8, a plurality of pieces of model information according to an embodiment of the disclosure may be determined by an external device, and the external device may be a separate device different from the display device 100 according to an embodiment of the disclosure. For example, the external device may determine parameters included in an image processing network 810 by training an image processing network 810 based on a training data set. The image processing network 810 of FIG. 8 may be a network including the same structure as the image processing network 30 described with reference to FIGS. 1 to 7.

The image processing network 810 may be a deep neural network (DNN) including a plurality of layers, and in order for a neural network to accurately output resultant data corresponding to input data, the neural network is to be trained according to the purpose. Here, 'training' may refer to training a neural network so that the neural network may discover or learn by itself a method of inputting various types of data into the neural network and analyzing the input data, a method of classifying the input data, and/or a method of extracting features necessary for generating resultant data from the input data, or the like. In detail, through a training process, a neural network may learn training data to optimize and set parameters in the neural network (weights, coefficients). The neural network set with the optimized parameters may self-learn input data to output a desired result.

The image processing network 810 according to an embodiment of the disclosure may be a neural network that receives an image, performs image processing such as upscaling or image quality processing, and outputs an image-processed image.

The external device may obtain a plurality of pieces of model information by training the image processing network 810 based on a plurality of training data sets. The plurality of training data sets may be generated based on a plurality of training images having different object features.

For example, when image processing according to an embodiment of the disclosure is upscaling for improving a resolution, a first training data set may include low-resolution face images and high-resolution face images. In addition, a second training data set may include low-resolution text images and high-resolution text images. Also, a third training data set may include low-resolution animal images and high-resolution animal images, and a fourth training data set may include low-resolution background images and high-resolution background images.

The external device may determine first model information (parameter information of model A) by training the image processing network 810 based on the first training data set.

For example, the external device may input a low-resolution face image included in the first training data set to the image processing network 810 to update parameters included in the image processing network 810 such that a difference between an output image (output data) and a high-resolution face image is minimized, to thereby determine the first model information (parameter information of model A). Accordingly, the image processing network 810 that is trained based on the first training data set may be an upscaling model (model A) optimized for a face image.

In the same manner, the external device may determine second model information (parameter information of model B) by training the image processing network 810 based on the second training data set. Accordingly, the image processing network 810 trained based on the second training data set may be an upscaling model (model B) optimized for a text image.

Also, the external device may determine third model information (parameter information of model C) by training the image processing network 810 based on the third training data set. Accordingly, the image processing network 810 trained based on the third training data set may be an upscaling model (model C) optimized for an animal image.

Also, the external device may determine fourth model information (parameter information of model D) by training the image processing network 810 based on the fourth training data set. Accordingly, the image processing network 810 trained based on the fourth training data set may be an upscaling model (model D) optimized for an animal image.

Figure 9:
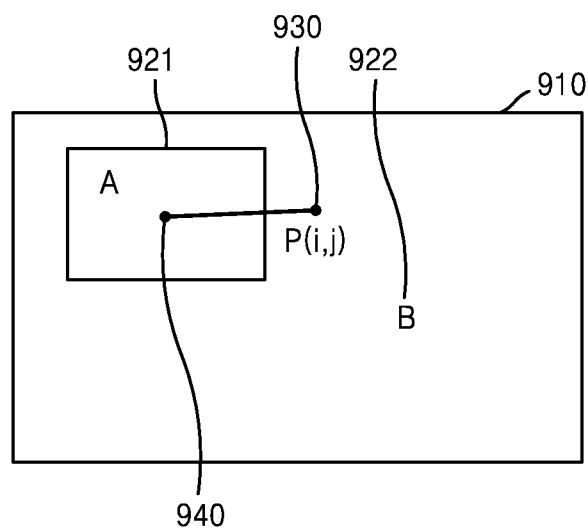
FIG. 9 is a diagram for describing a method of obtaining model information corresponding to a first image, according to an embodiment of the disclosure.

FIG. 9 is a diagram for describing a method of obtaining model information corresponding to a first image, according to an embodiment of the disclosure.

The display device 100 according to an embodiment of the disclosure may detect one or more objects included in a first image 910 to determine an object region. For example, the display device 100 may divide the first image 910 into a first object region 921 in which a face of a person is detected and a second object region 922 in which a face of a person is not detected. The display device 100 according to an embodiment of the disclosure may allocate a first model (model A) corresponding to face features to pixels included in the first object region 921, and allocate a second model (model B) corresponding to background features to pixels included in the second object region 922.

As described with reference to FIGS. 1 to 7, the display device 100 may update parameters included in an image processing network based on model information respectively corresponding to pixels included in the first image 910, and perform image processing on a region including each of the pixels as a center, based on the updated parameters.

When the display device 100 processes the first image 910, at a boundary between the first object region 921 and the second object region 922, the model information is changed from the first model information to the second model information or from the second model information to the first model information. When a difference between the first model information and the second model information is relatively large, due to a sudden change in the parameters, there may be discontinuity at the boundary between the first object region and the second object region of a second image output from the image processing network.

Accordingly, the display device 100 according to an embodiment of the disclosure may obtain model information respectively corresponding to pixels included in the first image 910 based on a weighted sum of the first model information corresponding to the first object region 921 and the second model information corresponding to the second object region 922, such that model information between the first object region 921 and the second object region 922 is gradually changed.

For example, when object regions included in a first image are two, that is, a first object region and a second object region, model information respectively corresponding to pixels included in the first image may be expressed by Equation 1 below.

model information=first weight×first model information+(1−first weight)×second model information  [Equation 1]

Also, Equation 1 may be expressed by Equation 2 as below.

model information=second model information+first weight×(first model information−second model information)  [Equation2]

In Equation 2, when a difference between the first model information and the second model information is defined as a delta model, Equation 2 may be simply expressed by Equation 3 below.

model information=second model information+first weight×delta model  [Equation 3]

The delta model of Equation 3 may be used to obtain model information without additional calculation by calculating a difference between the first model information and the second model information in advance.

A method of obtaining model information without using a delta model (for example, Equation 1) requires as many multiplication operations as twice the number of parameters included in the model; when the number of parameters is 1 million, 2 million multiplication operations are required.

However, in the method of obtaining model information using a delta model as shown in Equation 3, the number of multiplication operations is reduced by half compared to the method using Equation 1. Accordingly, when implementing a network, additional power consumption may be minimized. In addition, the delta model indicates a difference between models, and a statistical distribution of parameters included in the delta model is mainly concentrated in a relatively small range. Thus, the delta model is advantageous for quantization or compression.

By obtaining model information using a delta model, according to an embodiment of the disclosure, quantization precision may be reduced and power consumption may be minimized.

Also, even when an image includes three or more objects, as a partial region of the image may be expressed as a single object region with a background region, the method of obtaining model information using a delta model, according to an embodiment of the disclosure, may also be applied to three or more object regions.

Referring to FIG. 9, the display device 100 may determine a first weight based on a distance between a first pixel 930 included in the first image 910 and a center 940 of the first object region 921. When the first object region 921 is in the form of a bounding box, the center 940 of the first object region 921 may be calculated by Equation 4 below.

Coordinates of a center of an object region=(upper left coordinates of the object region+lower right coordinates of the object region)/2  [Equation 4]

The first weight according to an embodiment of the disclosure has a value of 0 or more and 1 or less, and is inversely proportional to the distance between the first pixel 930 and the center 940 of the first object region 921. For example, a value of the first weight decreases as the distance to the center 940 of the first object region 921 increases, and increases as the distance decreases.

When model information respectively corresponding to the pixels included in the first image 910 appears as a weighted sum of the first model information (model information A) and the second model information (model information B), the parameter updater 610 according to an embodiment of the disclosure may calculate a weighted sum of the first model information and the second model information based on the first weight and update a parameter of a layer based on the weighted sum of the first model information and the second model information.

Figure 10:
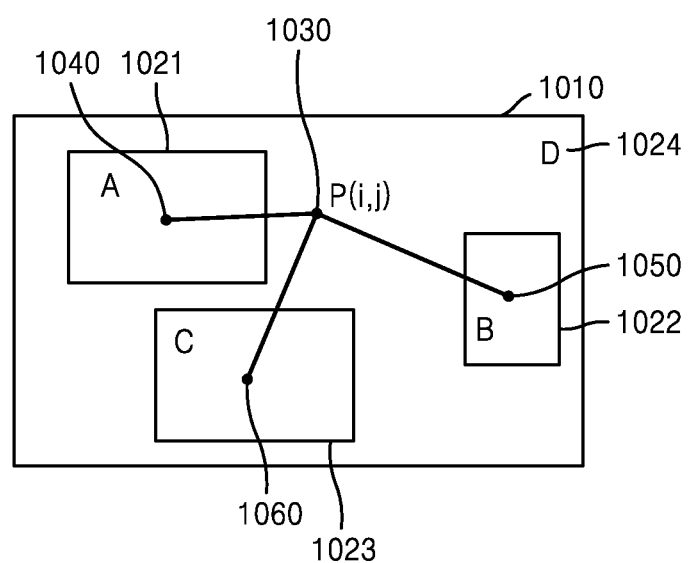
FIG. 10 is a diagram for describing a method of obtaining model information corresponding to a first image, according to an embodiment of the disclosure.

FIG. 10 is a diagram for describing a method of obtaining model information corresponding to a first image, according to an embodiment of the disclosure.

Referring to FIG. 10, a first image 1010 according to an embodiment of the disclosure may be divided into three or more object regions. For example, the first image 1010 may be divided into first to fourth object regions 1021, 1022, 1023, and 1024. The first object region 1021 is a region from which a face is detected and may include face features. The second object region 1022 is a region in which a text is detected and may include text features, the third object region 1023 is a region in which an animal is detected and may include animal features, and the fourth object region 1024 is a region other than the first to third object regions 1021, 1022, and 1023, and may include background features. However, the disclosure is not limited thereto.

The display device 100 according to an embodiment of the disclosure may obtain model information respectively corresponding to the pixels included in the first image 1010, based on a weighted sum of first model information A corresponding to face features, second model information B corresponding to text features, third model information C corresponding to animal features, and fourth model information D corresponding to background features.

For example, model information about a first pixel 1030 included in the first image 1010 may be obtained by summing up a value obtained by applying the first weight to the first model information A, a value obtained by applying a second weight to the second model information B, a value obtained by applying a third weight to the third model information C, and a value obtained by applying a fourth weight to the fourth model information D.

The first weight is a value that is inversely proportional to a distance between the first pixel 1030 and a center 1040 of the first object region 1021, and the second weight is a value that is inversely proportional to a distance between the first pixel 1030 and a center 1050 of the second object region 1022, and the third weight is a value that is inversely proportional to a distance between the first pixel 1030 and a center 1060 of the third object region 1023. The first to third weights may be normalized values, and the fourth weight may be determined as a value obtained by subtracting the first to third weights from 1.

While FIGS. 9 and 10 illustrate and describe a case where an object region is expressed as a bounding box, when the object region is expressed as a segmentation region in units of pixels, a center of the object region may be obtained by calculating an average of all pixel coordinates included in the object region.

In addition, in the description with reference to FIGS. 9 and 10, the display device 100 uses only a weight that is determined according to a distance between a pixel and a center of an object region to calculate model information corresponding to the pixel. However, the disclosure is not limited thereto, and the weight may be determined by considering not only a distance to the object region, but also an area of the object region, a ratio of the object region in a first image, luminance of the object region, or the like.

Figure 11:
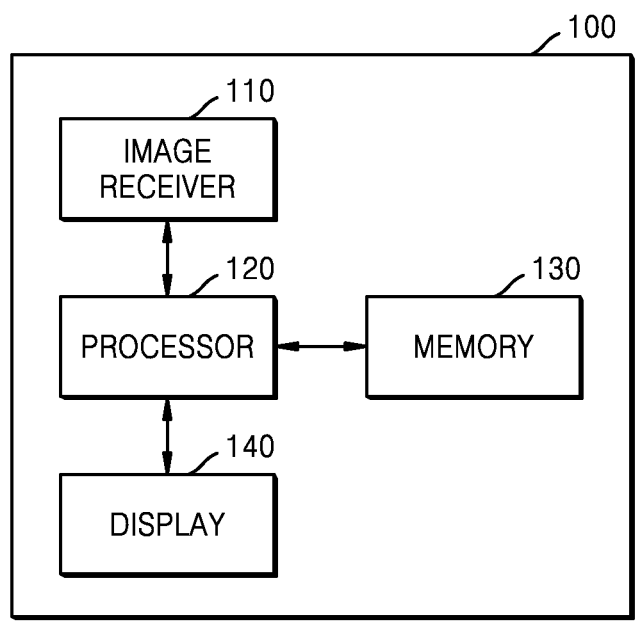
FIG. 11 is a block diagram of a configuration of a display device according to an embodiment of the disclosure.

FIG. 11 is a block diagram of a configuration of a display device according to an embodiment of the disclosure.

Referring to FIG. 11, the display device 100 according to an embodiment of the disclosure may include an image receiver 110, a processor 120, a memory 130, and a display 140.

The image receiver 110 according to an embodiment of the disclosure may include a communication interface, an input/output interface, and the like. For example, the communication interface may transmit/receive data or signals to and from an external device or server. For example, the communication interface may include a transceiver, a Wi-Fi module, a Bluetooth module, an infrared communication module and a wireless communication module, a local area network (LAN) module, an Ethernet module, a wired communication module, and the like. Each communication module may be implemented in the form of at least one hardware chip.

The Wi-Fi module and the Bluetooth module perform communication using a Wi-Fi method and a Bluetooth method, respectively. In the case of using a Wi-Fi module or a Bluetooth module, various types of connection information such as a service set identifier (SSID) and a session key are first transmitted and received, and various types of information may be transmitted/received after establishing a communication connection by using the connection information. The wireless communication module may include at least one communication chip that performs communication according to various wireless communication standards such as Zigbee, $3^{rd}$ Generation (3G), $3^{rd}$ Generation Partnership Project (3GPP), Long Term Evolution (LTE), LTE Advanced (LTE-A), 4th Generation (4G), 5th Generation (5G), etc.

Alternatively, the input/output interface may receive a video (e.g., a moving image, etc.), audio (e.g., voice, music, etc.) and additional information (e.g., electronic program guide (EPG), etc.) from outside of the display device 100. The input/output interface may include one of a High-Definition Multimedia Interface (HDSI), a Mobile High-Definition Link (MHL), a Universal Serial Bus (USB), a Display Port (DP), Thunderbolt, a Video Graphics Array (VGA) port, a RGB port, a D-subminiature (D-SUB), a Digital Visual Interface (DVI), a component jack (component jack), and a PC port.

The image receiver 110 according to an embodiment of the disclosure may receive one or more images.

The processor 120 according to an embodiment of the disclosure may control the overall operation of the display device 100 and a signal flow between internal components of the display device 100 and process data.

The processor 120 may include a single core or a multi-core such as a dual-core, a triple-core, a quad-core or the like. Also, the processor 120 may include a plurality of processors. For example, the processor 120 may be implemented as a main processor and a sub processor operating in a sleep mode.

In addition, the processor 120 according to an embodiment of the disclosure may include at least one of a center processing unit (CPU), a graphic processing unit (GPU), or a video processing unit (VPU). Alternatively, according to an embodiment of the disclosure, the processor 120 may be implemented in the form of a system on chip (SoC) in which at least one of a CPU, a GPU, or a VPU is integrated.

The memory 130 according to an embodiment of the disclosure may store various data, programs, or applications for driving and controlling the display device 100.

A program stored in the memory 130 may include one or more instructions. A program (one or more instructions) or an application stored in the memory 130 may be executed by the processor 120.

The processor 120 according to an embodiment of the disclosure may include at least one of the object detection module described with reference to FIG. 4 or the parameter updater described with reference to FIG. 6.

The processor 120 according to an embodiment of the disclosure may extract object features respectively corresponding to the pixels included in the received first image, and may obtain model information respectively corresponding to the pixels based on the object features. For example, the processor 120 may detect one or more objects included in the first image, and determine one or more object regions based on the detected objects. Here, the display device 100 may use a method of expressing the detected object region included in the first image as a bounding box (square) and a segmentation method of expressing the detected object region in units of pixels. However, the disclosure is not limited thereto.

When one or more object regions are determined, the processor 120 may determine model information corresponding to object features of the object regions as model information corresponding to pixels included in the object regions. For example, the processor 120 may allocate model information corresponding to face features, to pixels included in a "face" region detected in the first image. In addition, model information corresponding to text features may be assigned to pixels included in a "text" region. The processor 120 may obtain model information respectively corresponding to the pixels included in the first image in the above-described manner. Also, the processor 120 may obtain model information for each region included in the first image.

Also, the processor 120 may obtain model information of each pixel included in the first image based on a weighted sum of pieces of model information corresponding to object regions detected from the first image. For example, the processor 120 may determine a weight of model information corresponding to an object region based on a distance between a first pixel included in the first image and a center of the object region detected from the first image, and obtain model information of the first pixel based on the determined weight.

The processor 120 may receive parameter update information in which pixel information of a pixel included in the first image, model information corresponding to the pixel, and time point information corresponding to the pixels are mapped to each other. The time point information corresponding to the pixel may be a time point when a region having the pixel as a center pixel is input to a first layer of the image processing network or a time point when a region input to the first layer is processed in the first layer. The processor 120 may obtain model information corresponding to the first layer based on a time point when a region having each of the pixels as a center pixel is input to the first layer 31 of the image processing network and model information of each of the pixels.

In addition, with respect to the remaining layers except for the first layer of the image processing network, the processor 120 may obtain model information corresponding to the remaining layers based on model information used for parameter setting of a previous layer at a previous time point.

The processor 120 may update parameters of respective layers based on model information obtained for each layer. For example, the processor 120 may update a parameter of the first layer to a parameter included in first model information corresponding to the first region, based on the first region of the first image, input to the first layer, and update the parameter of the first layer to a parameter included in second model information corresponding to a second region and update a parameter of a second layer to a parameter included in the first model information, based on the first region input to the second layer which is a next layer of the first layer and the second region input to the first layer. In addition, based on the first region input to a third layer which is a next layer of the second layer, the second region input to the second layer, and a third region input to the first layer, the parameter of the first layer may be updated to a parameter included in third model information corresponding to the third region, the parameter of the second layer may be updated to a parameter included in the second model information, and a parameter of the third layer may be updated to a parameter included in the first model information.

For example, the processor 120 may perform a calculation in each of the plurality of layers based on the updated parameters, and may input a result of the calculation to a next layer. The processor 120 may obtain the second image by repeating a parameter update operation and a calculation operation in each of the plurality of layers at every preset period.

The processor 120 may control to display the second image on the display 140.

The display 140 according to an embodiment of the disclosure generates a driving signal by converting an image signal, a data signal, an on-screen display (OSD) signal, a control signal, or the like processed by the processor 120. The display 140 may be implemented with a plasma display panel (PDP), a liquid crystal display (LCD), an organic light-emitting diode (OLED), a flexible display or the like, and also as a three-dimensional (3D) display. In addition, the display 140 may be configured with a touch screen and used as an input device as well as an output device.

The display 140 according to an embodiment of the disclosure may display the second image on which upscaling or image quality processing is performed.

Figure 12:
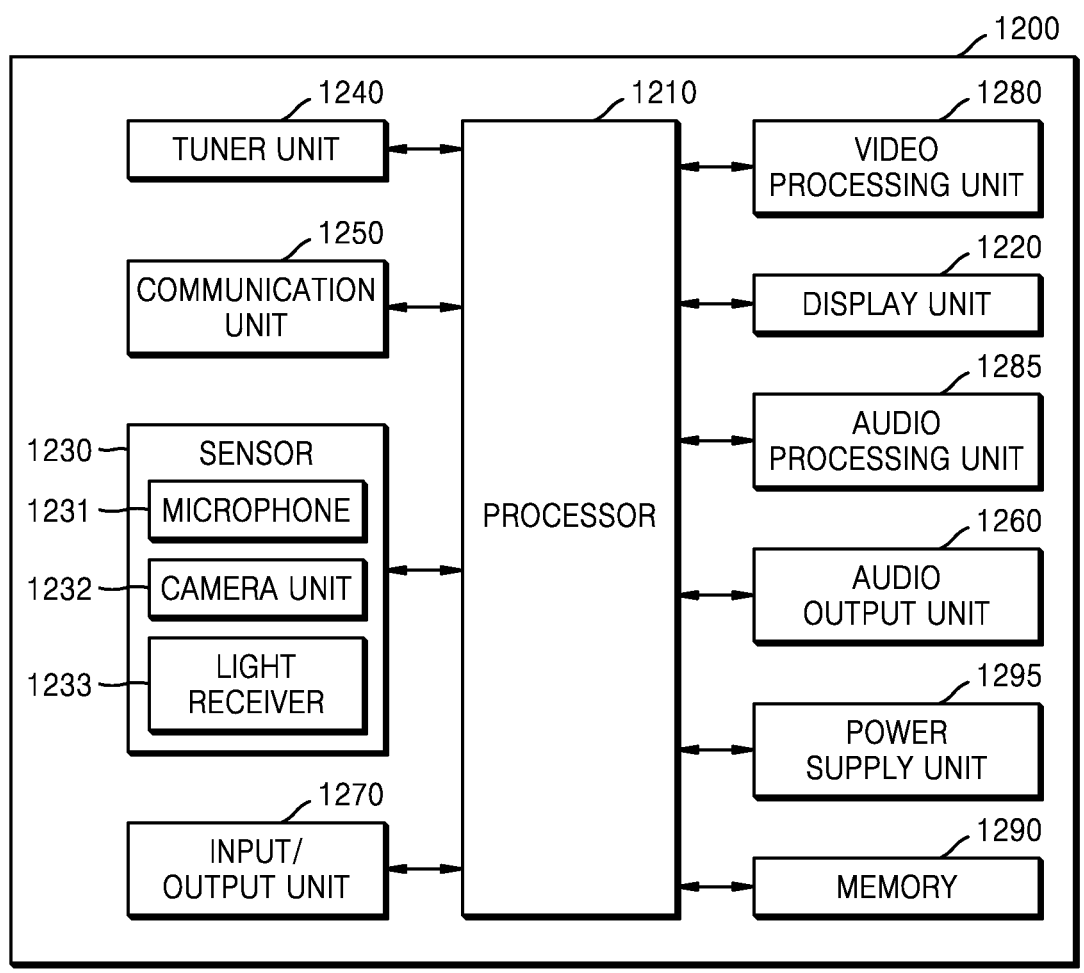
FIG. 12 is a block diagram of a configuration a display device according to another embodiment of the disclosure.

FIG. 12 is a block diagram of a configuration of a display device according to another embodiment of the disclosure.

Referring to FIG. 12, a display device 1200 of FIG. 12 may be an embodiment of the display device 100 described with reference to FIGS. 1 to 11.

Referring to FIG. 12, the display device 1200 according to an embodiment of the disclosure may include a tuner unit 1240, a processor 1210, a display unit 1220, a communication unit 1250, a sensor 1230, and an input/output unit 1270, a video processing unit 1280, an audio processing unit 1285, an audio output unit 1260, a memory 1290, and a power supply unit 1295.

The communication unit 1250 of FIG. 12 is a configuration corresponding to the communication interface included in the image receiver 110 of FIG. 11, and the input/output unit 1270 of FIG. 12 is a configuration corresponding to the input/output interface included in the image receiver 110 of FIG. 11, and the processor 1210 of FIG. 12 corresponds to the processor 120 of FIG. 11, the memory 1290 corresponds to the memory 130 of FIG. 11, and the display unit 1220 of FIG. 12 corresponds to the display 140 of FIG. 11. Thus, description of details provided above will be omitted here.

The tuner unit 1240 according to an embodiment of the disclosure may tune and select a frequency of a channel that the display device 1200 is to receive, from among a large number of radio wave components, by performing amplification, mixing, resonance, etc. on a broadcasting signal received in a wired or wireless manner. The broadcast signal includes audio, video, and additional information (for example, Electronic Program Guide (EPG)).

The tuner unit 1240 may receive broadcast signals from various sources, such as terrestrial broadcast, cable broadcast, satellite broadcast, Internet broadcast, and the like. The tuner unit 1240 may receive a broadcast signal from a source such as an analog broadcast or digital broadcast.

The sensor 1230 may detect a user's voice, a user's image, or a user's interaction, and may include a microphone 1231, a camera unit 1232, and a light receiver 1233.

The microphone 1231 may receive an uttered voice of a user. The microphone 1231 may convert received voice into an electrical signal and output the same to the processor 1210. The user's voice may include, for example, a voice corresponding to a menu or function of the display device 1200.

The camera unit 1232 may receive an image corresponding to a user's motion including a gesture within a range of camera recognition (e.g., continuous frames). The processor 1210 may select a menu displayed on the display device 1200 by using a recognition result of a received motion or perform control corresponding to a motion recognition result.

The light receiver 1233 may receive a light signal (including a control signal) received from an external control device, via a light window of a bezel of the display unit 1220. The light receiver 263 may receive a light signal corresponding to a user input (e.g., a touch, pressing, a touch gesture, voice, or motion) from a remote control device. A control signal may be extracted from the received optical signal under the control by the processor 1210.

The processor 1210 may control the overall operation of the display device 1200 and a signal flow between internal components of the display device 1200 and process data. The processor 1210 may execute an operation system (OS)

and various applications stored in the memory 1290 when there is a user input or a preset and stored condition is satisfied.

The processor 1210 may include RAM used to store a signal or data input from the outside of the display device 1200 or as a storage region corresponding to various jobs performed in the display device 1200, and ROM storing a control program for controlling the display device 1200, and a processor.

The video processing unit 1280 performs processing on video data received by the display device 1200. The video processing unit 1280 may perform various image processing, such as decoding, scaling, noise removal, frame rate conversion, resolution conversion, and the like, on video data.

The audio processing unit 1285 may perform processing on audio data. In the audio processing unit 1285, various processing such as decoding or amplification or noise removal on audio data may be performed. The audio processing unit 1285 may include a plurality of audio processing modules to process audio corresponding to a plurality of pieces of contents.

The audio output unit 1260 outputs audio included in a broadcast signal received through the tuner unit 1240 under the control by the processor 1210. The audio output unit 1260 may output audio (for example, voice, sound) input through the communication unit 1250 or the input/output unit 1270. Also, the audio output unit 1260 may output audio stored in the memory 1290 under the control by the processor 1210. The audio output unit 1260 may include at least one of a speaker, a headphone output terminal or a Sony/Phillips Digital Interface (S/PDIF) output terminal.

The power supply unit 1295 supplies power input from an external power source to the components inside the display device 1200 under the control by the processor 1210. Also, the power supply unit 1295 may supply power output from one or more batteries positioned inside the display device 1200 to the internal components therein under the control by the processor 1210.

The memory 1290 may store various data, programs, or applications for driving and controlling the display device 1200 under the control by the processor 1210. The memory 1290 may include a broadcast reception module, a channel control module, a volume control module, a communication control module, a voice recognition module, a motion recognition module, a light reception module, a display control module, an audio control module, an external input control module, a power control module, a power control module of an external device connected wirelessly (for example, Bluetooth), a voice database (DB), or a motion database (DB). The modules and the databases of the memory 1290 may be implemented in the form of software to perform, in the display device 1200, a broadcast reception control function, a channel control function, a volume control function, a communication control function, a voice recognition function, a motion recognition function, and a light reception control function, a display control function, an audio control function, an external input control function, a power control function, or a power control function of an external device connected wirelessly (for example, Bluetooth). The processor 1210 may perform respective functions by using these software stored in the memory 1290.

The block diagrams of the display devices 100 and 1200 illustrated in FIGS. 11 and 12 are block diagrams for an embodiment of the disclosure. Each component of the block diagrams may be integrated, added, or omitted according to the specifications of the display devices 100 and 1200 that are actually implemented. That is, when necessary, two or more components may be combined into a single component, or a single component may be divided into two or more components. In addition, functions performed by each block are for explaining embodiments of the disclosure, and specific operations or devices thereof do not limit the scope of the disclosure.

An operating method of the display device according to the embodiments of the disclosure may be embodied as program commands executable by various computer means and may be recorded on a computer-readable recording medium. The computer-readable recording medium may include program commands, a data file, a data structure etc. alone or in combination. The program commands written to the computer-readable recording medium may be specifically designed and configured for the disclosure or may be well-known and available to one of ordinary skill in the art. Examples of the computer-readable recording medium include magnetic media (e.g., hard disks, floppy disks, magnetic tapes, etc.), optical media (e.g., CD-ROMs, or DVDs), magneto-optical media (e.g., floptical disks), and hardware devices specifically configured to store and execute program commands (e.g., ROM, RAM, flash memories, etc.). Examples of the program commands include not only machine language codes made by a compiler but also high-level language codes that can be executed by a computer by using an interpreter or the like.

Also, the operating method of the display device according to the disclosed embodiments may be included in a computer program product and provided in that form. Computer program products can be traded between sellers and buyers as commodities.

The computer program products may include an S/W program, a computer-readable storage medium in which the S/W program is stored. For example, the computer program product may include a product (e.g., a downloadable app) in the form of an S/W program distributed electronically through a device manufacturer or an electronic market (e.g., Google Play Store, App Store, etc.). For electronic distribution, at least a portion of an S/W program may be stored in a storage medium or may be temporarily generated. In this case, the storage medium may be a storage medium of a server of a manufacturer, a server of an electronic market, or a relay server temporarily storing a SW program.

In a system consisting of a server and a client device, the computer program product may include a storage medium of the server or a storage medium of the client device. Alternatively, when there is a third device (e.g., a smartphone) that is connected to the server or the client device through communication, the computer program product may include a storage medium of the third device. Alternatively, the computer program product may include S/VV program itself transmitted from the server to the client device or the third device, or transmitted from the third device to the client device.

In this case, one of the server, the client device, and the third device may execute a computer program product to perform the method according to the disclosed embodiments. Alternatively, two or more of the server, the client device, and the third device may execute a computer program product to implement the method according to the disclosed embodiments in a distributed manner.

For example, a server (e.g., a cloud server or an artificial intelligence server) may execute a computer program product stored in the server to control a client device communicatively connected with the server to perform the method according to the disclosed embodiments.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display device for performing image processing by using a neural network including a plurality of layers, the display device comprising:
   a display;
   a memory storing one or more instructions; and
   a processor configured to execute the one or more instructions stored in the memory to:
   obtain a plurality of pieces of model information respectively corresponding to pixels included in a first image based on object features respectively corresponding to the pixels;
   identify the plurality of pieces of model information respectively corresponding to the plurality of layers based on the plurality of pieces of model information respectively corresponding to the pixels input to the neural network and information about a time point at which each of the pixels is processed in the neural network;
   update parameters of the plurality of layers, based on the plurality of pieces of model information;
   obtain a second image by processing the first image via the plurality of layers to which the updated parameters are applied; and
   control the display to display the second image.

2. The display device of claim 1, wherein the information about the time point comprises at least one of information about a data input time at which each of the pixels is input to each of the plurality of layers or information about a data processing time at which each of the pixels is processed in each of the plurality of layers.

3. The display device of claim 2, wherein at least one of the data input time or the data processing time has a predetermined period.

4. The display device of claim 1, wherein the information about the time point is determined based on location of each of the pixels in the first image.

5. The display device of claim 1, wherein the plurality of layers are connected in series, and
   the processor is further configured to sequentially input each pixel value of the pixels included in the first image to the plurality of layers.

6. The display device of claim 1, wherein the plurality of layers comprises a first layer and a second layer that follows the first layer, and the pixels of the first image comprise a first pixel and a second pixel, and
   wherein the processor is further configured to execute the one or more instructions to:
   update a parameter of the first layer to a parameter included in first model information corresponding to the first pixel based on a first pixel value of the first pixel that is input to the first layer; and
   update the parameter of the first layer to a parameter included in second model information corresponding to the second pixel and update a parameter of the second layer to a parameter included in the first model information, based on the first pixel value of the first pixel input to the second layer and a second pixel value of the second pixel input to the first layer.

7. The display device of claim 6, wherein the plurality of layers comprises a third layer that follows the second layer, and the pixels of the first image further comprise a third pixel, and
   wherein the processor is further configured to execute the one or more instructions to update the parameter of the first layer to a parameter included in third model information corresponding to the third pixel, update the parameter of the second layer to a parameter included in the second model information, and update a parameter of the third layer to a parameter included in the first model information, based on the first pixel value of the first pixel input to the third layer, the second pixel value of the second pixel input to the second layer, and a third pixel value of the third pixel input to the first layer.

8. The display device of claim 1, wherein the processor is further configured to execute the one or more instructions to:
   detect object regions included in the first image; and
   obtain the plurality of pieces of model information respectively corresponding to the pixels included in the first image based on a plurality of pieces of model information corresponding to the object regions.

9. The display device of claim 8, wherein the processor is further configured to execute the one or more instructions to obtain the plurality of pieces of model information respectively corresponding to the pixels based on a weighted sum of the plurality of pieces of model information corresponding to the object regions.

10. The display device of claim 9, wherein the processor is further configured to execute the one or more instructions to:
    determine weights of the plurality of pieces of model information respectively corresponding to the object regions based on a distance between a first pixel included in the first image and a center of each of the object regions; and
    obtain model information corresponding to the first pixel based on the plurality of pieces of model information respectively corresponding to the object regions and the determined weights.

11. An operating method of a display device for performing image processing by using a neural network including a plurality of layers, the operating method comprising:
    receiving a first image;
    obtaining a plurality of pieces of model information respectively corresponding to pixels included in the first image based on object features respectively corresponding to the pixels;
    identifying the plurality of pieces of model information respectively corresponding to the plurality of layers based on the plurality of pieces of model information respectively corresponding to the pixels input to the neural network and information about a time point at which each of the pixels is processed in the neural network;
    updating parameters of the plurality of layers based on the plurality of pieces of model information;
    generating a second image by processing the first image via the plurality of layers to which the updated parameters are updated; and
    displaying the second image.

12. The operating method of claim 11, wherein the information about the time point comprises at least one of information about a data input time at which each of the pixels is input to each of the plurality of layers or information about a data processing time at which each of the pixels is processed in each of the plurality of layers.

13. The operating method of claim 12, wherein at least one of the data input time or the data processing time has a uniform period.

14. The operating method of claim 11, wherein the information about the time point is determined based on location of each of the pixels in the first image.

15. The operating method of claim 11, wherein the plurality of layers are connected in series, and
pixel values of the pixels included in the first image are sequentially input to the plurality of layers and sequentially output.

16. The operating method of claim 11, wherein the plurality of layers comprises a first layer and a second layer that follows the first layer, and the pixels of the first image comprise a first pixel and a second pixel, and
wherein the updating of the parameters of the plurality of layers comprises:
updating a parameter of the first layer to a parameter included in first model information corresponding to the first pixel based on a first pixel value of the first pixel that is input to the first layer; and
updating the parameter of the first layer to a parameter included in second model information corresponding to the second pixel and updating a parameter of the second layer to a parameter included in the first model information, based on the first pixel value of the first pixel input to the second layer and a second pixel value of the second pixel input to the first layer.

17. The operating method of claim 16, wherein the plurality of layers comprises a third layer that follows the second layer, and the pixels of the first image further comprise a third pixel, and
the updating of the parameters of the plurality of layers comprises updating the parameter of the first layer to a parameter included in third model information corresponding to the third pixel, updating the parameter of the second layer to a parameter included in the second model information, and updating a parameter of the third layer to a parameter included in the first model information, based on the first pixel value of the first pixel input to the third layer, the second pixel value of the second pixel input to the second layer, and a third pixel value of the third pixel input to the first layer.

18. The operating method of claim 11, further comprising detecting object regions included in the first image,
wherein the obtaining of the plurality of pieces of model information respectively corresponding to the pixels comprises obtaining the plurality of pieces of model information respectively corresponding to the pixels included in the first image based on a plurality of pieces of model information corresponding to the object regions.

19. The operating method of claim 18, wherein the obtaining of the plurality of pieces of model information respectively corresponding to the pixels comprises obtaining the plurality of pieces of model information respectively corresponding to the pixels based on a weighted sum of the plurality of pieces of model information corresponding to the object regions.

20. A non-transitory computer-readable recording medium having stored therein a program including instructions causing to execute a method of performing image processing via a neural network comprising a plurality of layers, the method comprising:
obtaining a first image;
obtaining a plurality of pieces of model information respectively corresponding to pixels included in the first image based on object features respectively corresponding to the pixels;
identifying the plurality of pieces of model information respectively corresponding to the plurality of layers based on the plurality of pieces of model information respectively corresponding to the pixels input to the neural network and information about a time point at which each of the pixels is processed in the neural network;
updating parameters of the plurality of layers based on the plurality of pieces of model information; and
generating a second image by processing the first image via the plurality of layers to which the updated parameters are updated.

* * * * *